(12) United States Patent
Oertley

(10) Patent No.: US 6,899,651 B2
(45) Date of Patent: May 31, 2005

(54) REDUCED SOUND TRANSMITTING SPROCKET

(75) Inventor: Thomas E. Oertley, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 148 days.

(21) Appl. No.: 10/245,651

(22) Filed: Sep. 17, 2002

(65) Prior Publication Data

US 2004/0053722 A1 Mar. 18, 2004

(51) Int. Cl.$^7$ ............................................. F16H 55/12
(52) U.S. Cl. ..................... 474/162; 474/161; 305/137
(58) Field of Search ................................. 474/160–164, 474/901; 305/136, 137, 195, 199; 295/7

(56) References Cited

U.S. PATENT DOCUMENTS

| | | |
|---|---|---|
| 683,583 A | 10/1901 | White |
| 1,451,872 A | 4/1923 | French |
| 3,899,219 A | 8/1975 | Boggs |
| 3,934,484 A | 1/1976 | Bravin |
| 3,989,314 A | 11/1976 | Reinsma et al. |
| 3,996,814 A | 12/1976 | Westlake |
| RE30,039 E | 6/1979 | Clemens et al. |
| 4,752,281 A | 6/1988 | Lammers |
| 4,818,041 A | 4/1989 | Oertley |
| 4,881,930 A | 11/1989 | Oertley |
| 5,098,346 A | 3/1992 | Redmond |
| 5,203,861 A | 4/1993 | Irwin et al. |
| 5,456,638 A | 10/1995 | Osborn |
| 6,416,142 B1 | 7/2002 | Oertley |
| 6,540,630 B1 * | 4/2003 | Oertley ....................... 474/162 |

FOREIGN PATENT DOCUMENTS

| | | |
|---|---|---|
| DE | 101 21 333 A1 | 12/2001 |
| JP | 55-142159 | 9/1980 |
| JP | 2001027307 | 1/2001 |

OTHER PUBLICATIONS

U.S. Appl. No. 09/688,531, filed Oct. 16, 2000, entitled Reduced Sound Transmitting Sprocket for Track–Type Machines, Inventor: Oertley.

* cited by examiner

*Primary Examiner*—David A. Bucci
*Assistant Examiner*—Timothy McAnulty
(74) *Attorney, Agent, or Firm*—Jeff A Greene

(57) ABSTRACT

A drive sprocket assembly includes a hub having an endless chain connected thereto. A plurality of driver members are mounted between the hub and the endless chain to provide sound suppression.

8 Claims, 4 Drawing Sheets

Fig_1_

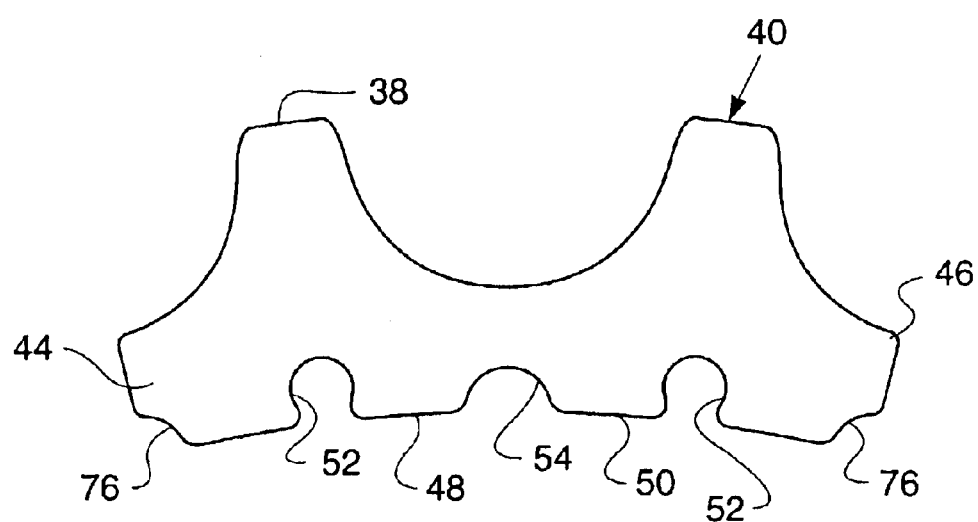
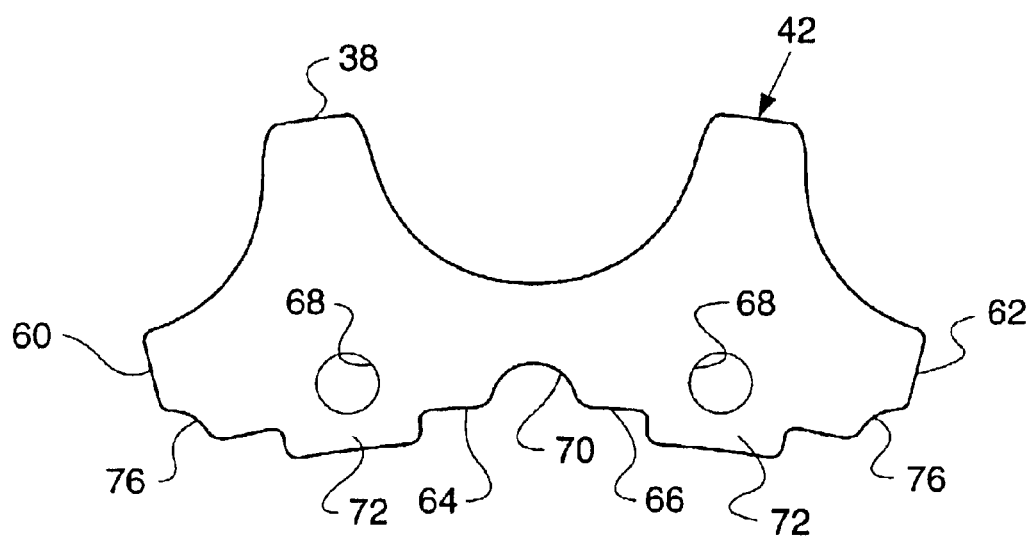

REDUCED SOUND TRANSMITTING SPROCKET

TECHNICAL FIELD

The present invention relates to track-type work machines, and more particular to a sprocket that has teeth mounted on a hub by compressible driving members.

BACKGROUND

Environmental regulations, in both the United States and other countries, are increasingly being directed to the suppression of noise emitted by construction machines such as track-type work machines. In track-type work machines undercarriage components are frequently major contributors to the overall noise of the machine. The undercarriage components include endless track chains, drive sprockets, idler wheels and track rollers.

A great amount of effort has been directed to noise abatement in undercarriage assemblies. For example, U.S. Pat. No. 4,881,930 issued Nov. 21, 1989 to Thomas E. Oertley describes an endless track sprocket assembly having a plurality of individually replaceable teeth structures with each tooth structure being resiliently isolated from adjacent tooth structures and from the sprocket support hub. However, such sprocket assemblies appear to be quite complicated and costly and utilize intricately formed pieces.

The present invention is directed to overcome one or more of the problems as set forth above.

SUMMARY OF THE INVENTION

In one aspect of the present invention a drive sprocket assembly for a track type machine is provided. The drive sprocket assembly includes a hub having an outer circumferential surface. A plurality of segments each having an inner surface and an outer surface are connected to the hub. A groove is positioned in one of the outer circumferential surface of the hub or the inner surface of the plurality of segments. A drive member is positioned in the groove between the hub and the plurality of segments.

BRIEF DESCRIPTION OF THE DRAWINGS

FIG. 4 is a diagrammatic side view of the outer segments of the endless chain of the sprocket embodying the present invention; and FIG. 5 is a diagrammatic side view of the center segments of the endless chain of the sprocket embodying the present invention.

DETAILED DESCRIPTION

Figure 1:
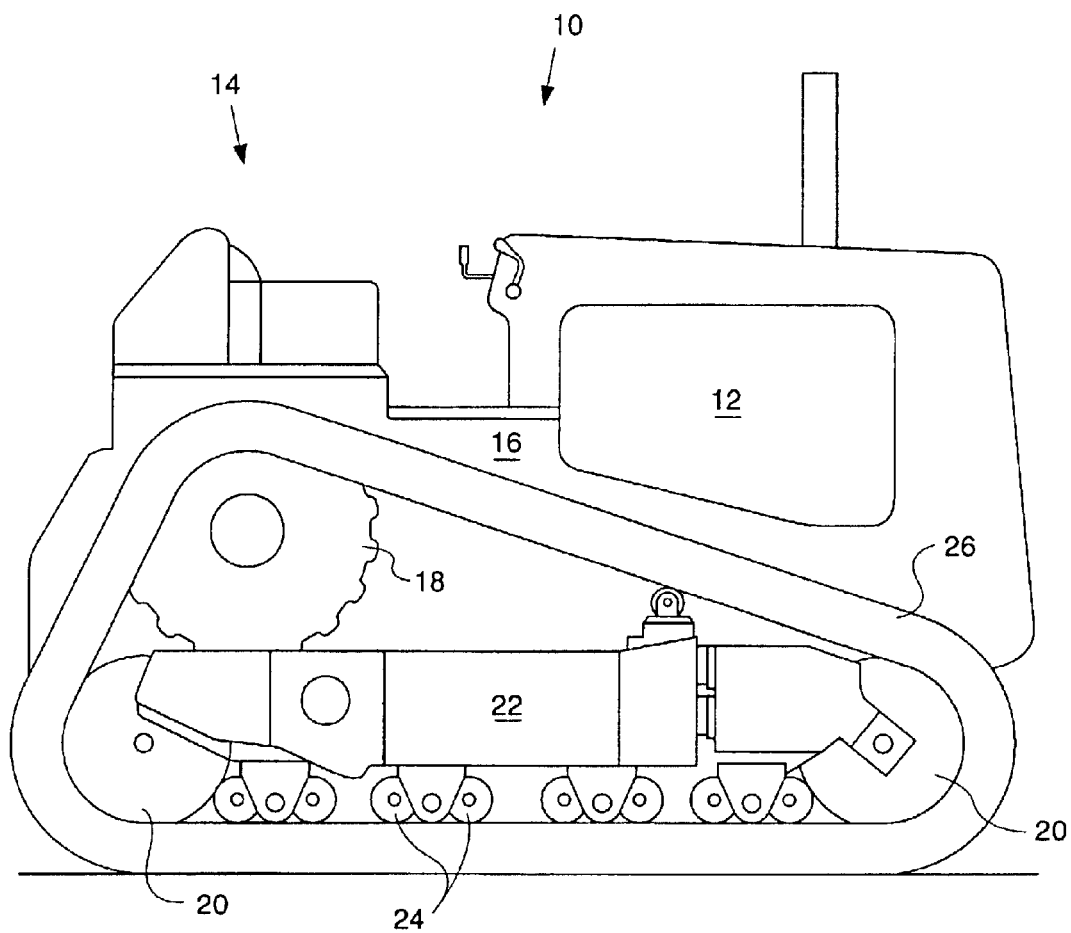
FIG. 1 is a diagrammatic side view of a track-type machine having a drive sprocket embodying the present invention.

Referring to the drawings, specifically FIG. 1, a track type machine 10 is shown. The track type machine 10 includes an engine 12, an operator's station 14, a main frame 16, a drive sprocket assembly 18, and front and rear idler assemblies 20. The main frame 16 supports a track roller frame 22, with the idler assemblies 20 being rotatably attached thereto, as well as a plurality of supporting guide rollers 24. An endless track 26 is entrained around the drive sprocket 18, the idler assemblies 20 and the supporting guide rollers 24.

The drive sprocket assembly 18 embodying the present invention is illustrated in FIGS. 2–5. The drive sprocket assembly 18 rotates about an axis of rotation 28 and has a centrally disposed hub portion 29 that has an annular flange 30 disposed about an outer peripheral surface 31 of the hub 29. The flange 30 has an outer peripheral surface 31 with a plurality of spaced slots 32, which extend in a direction parallel with the axis 28 of the drive sprocket assembly 18. A groove 34 defined in the outer peripheral surface 31 of the flange 30 extends annually between the slots 32. The slots 32 intersect the annular groove defined about the periphery of the flange 30.

The drive sprocket assembly 18 includes an endless chain 36 drivingly mounted on the flange 30 of the hub 28. The chain 36 forms a plurality of teeth 38 that interact with the bushings of the endless track 14 to propel the track-type machine 10.

The endless chain 36 is formed by a plurality of sprocket segments that are arranged in an overlapping manner to form a concentric band. Preferably, a plurality of outer arcuate segments 40 are positioned end-to-end and form at least two concentric bands or rows about the flange 30 of the hub 28. A plurality of center arcuate segments 42 are positioned end-to-end in a single band or row that is positioned about the flange 30 of the hub 28 and between the two bands of outer arcuate segments 40, as illustrated in FIG. 2.

A typical one of the outer arcuate segments 40 is illustrated in FIG. 4. Each of the outer arcuate segments 40 have a first end portion 44, a second end portion 46, an intermediate portion 48, at least one sprocket tooth 38 for contacting the track chain, and a radial inner surface 50. The first and second end portions 44, 46 each have an aperture 52 positioned inwardly from the inner surface 50 towards the sprocket tooth 38. The intermediate portion 48 has an axially oriented driver slot 54 also extending inwardly from the inner surface 50.

A representative one of the center arcuate segments 42 is shown in FIG. 5. The construction of the center arcuate segments 42 is similar to that of the outer arcuate segment 40. Each of the center segments 42 has a first end portion 60, a second end portion 62, an intermediate portion 64, at least one sprocket tooth 38, and an arcuate inner surface 66. The first and second end portions 60,62 each include an aperture 68. The intermediate portion 64 includes an axially orientated driver slot 70 extending from the inner surface 64. The first and second end portions 60,62 each include a radially extending tab 72 adapted to be received within the annular groove 34 defined in the flange 30 of the hub 29. The driver slots 54, 70 in the outer and inner segments 40,42 are positioned substantially equidistantly between the first ends 44, 60 and the second ends 46,62 and extend toward the sprocket teeth 38 inwardly from the radially innermost surface 50,66 of the respective segments 40,42. In addition, each of the outer and center segments 40,42 have an arced portion 76 of the driver slot 54,70 disposed at each of the first end portion 44, 60 and second end portion 46,62 which cooperate with a leading or following segment 40,42 disposed in the same circular band, or row, to provide a full one of the driver slots 54,70. Thus, each of the segments 40,42 has a full driver slot 54,70 and a pair of arced portion or partial driver slots 76.

Figure 2:
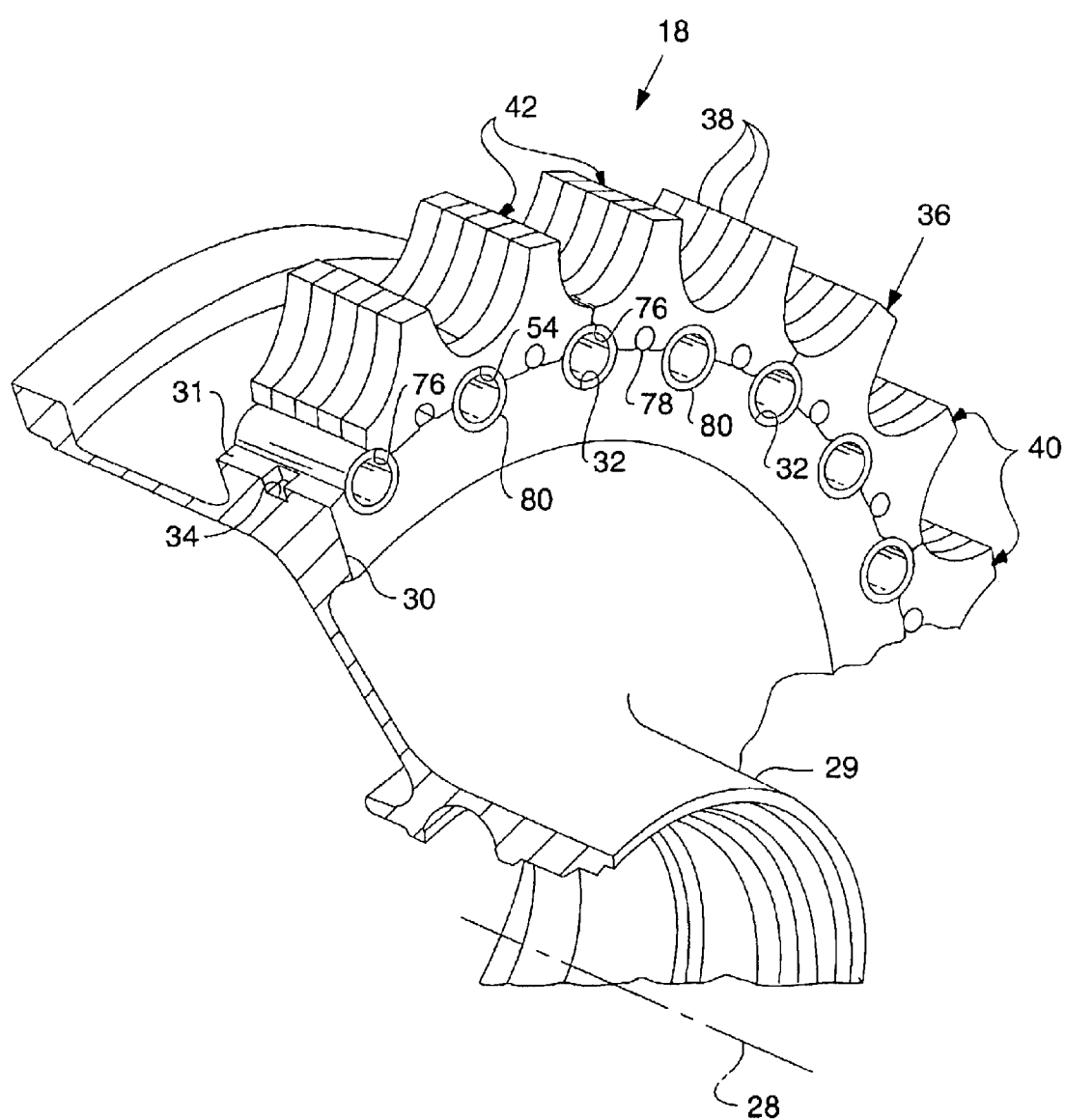
FIG. 2 is an enlarged diagrammatic isometric view of a portion of the sprocket embodying the present invention.
Figure 3:
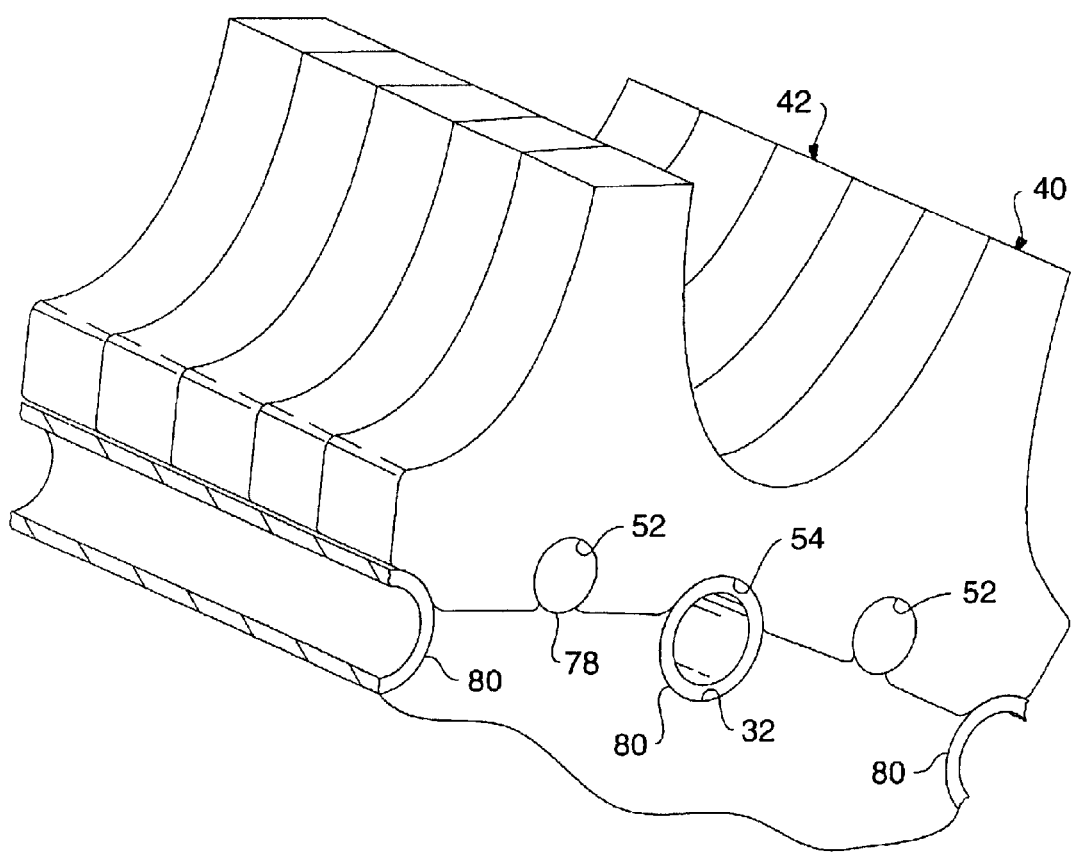
FIG. 3 is an enlarged section of the sprocket shown in FIG. 2.

The endless chain 36 is first assembled by itself, and then mounted on the flange 30 of the sprocket hub 28 as illustrated in FIG. 2. Advantageously, the arcuate segments 40,42 are positioned with one of the apertures 52,68 adjacent the first end portion 44,60 of one segment being aligned with the aperture 52,68 adjacent a second end of an adjacent segment 40,42. Thus, adjacent rows of the segments 40,42 are positioned so that the apertures 52,68 of one segment is aligned with the other one of the apertures 52,68 at an opposite end of respective adjacently disposed segments.

Inserting a pin 78 through the respectively aligned apertures 52,68 in the outer and inner segments 40,42 connects the outer and inner segments 40,42 together to form the endless chain 36. The outer ends of each pin 78 are desirably welded to the outer surface of the outermost arcuate segments 40. The assembled chain 36 is then installed over the flange 30 by aligning the radially extending tabs 72 of the center segments within the slots 32 in the outer flange 30 of the hub 29. The chain 36 is then slid axially over the flange 30 until the inwardly extending tabs 72 are axially aligned with the annular groove 34 formed in the flange 30. After the chain 36 is axially aligned on the flange 30, it is rotated radially to bring the driver slots 54,70 of the segments 40,42 into radial alignment with the slot 32 openings in the flange 30. At that position, the inwardly extending tabs 72 of the center segment 42 are positioned in the annular groove 32 between the slots 32.

After alignment of the driver slots 54,70 in each segment 40,42 with the axially extending driver slots 32 in the flange 30, a plurality of axially extending compressible driver members 80 are positioned in the aligned driver slots 54,70 and the driver slots 32. The driver members 80 are tubular metallic member having a predetermined diameter, length and wall thickness that are pressed into place. Alternately, drive members 80 may be constructed of separate layers of metal and elastomer that are rolled to have the length and diameter required. The endless chain 36 is thereby drivingly supported on the hub 28 by the plurality of driver members 80 within the axially aligned driver slots 54,70 in the segments 40,42 and the driver slots 32 defined in the flange 30 of the hub 29.

When assembled, the radially innermost surfaces 50,66 of the endless chain 36 are supported a small distance away from the outer surface 31 of the flange 30 by the driver members 80. During operation of the track-type machine 10 the continuous impact between the endless track 26 and the sprocket 18 and the weight of the track-type machine 10 causes the driver members 80 to compress and return back to their original shape. The amount of compression that the driver members 80 are subjected to is limited by the initial free clearance between the surfaces 50,66 of the segments 40, 42 and the outer surface 31 of the flange 30.

In an illustrative embodiment, a radial clearance of about 1–3 mm is provided between the outer surface peripheral surface 31 of the flange and the radially innermost surfaces 50, 66 of the segments 40,42 when assembled on the hub 29. The bottom surfaces of the radially extending tabs 72 of the center segments 42 are spaced a similar distance from the bottom of the annular groove 34 in the flange 30.

In the illustrated embodiment of the present invention, the endless chain 36 is composed of two rows, or bands of outer segments 40 disposed on each side of a single row or band of center segments 42. In other embodiments, the chain 36 may be composed of fewer segments, for example a single band of outer segments 40 disposed on each side of a central band of center segments 42, or alternatively more than two bands of outer segments 40 on each side of the center band. It is desirable, regardless of the number of adjacent rows, or bands, of segments 40,42 used to form the endless chain 36, that the pins 78 extend through at least three of the segments 40,42 disposed in adjacent relationship about the periphery of the flange 31.

INDUSTRIAL APPLICABILITY

Drive sprocket 18 is particularly useful in driving the endless track 26 of track-type machines 10 working in areas that are sensitive to the amount of noise generated by such track-type machines 10. The driver members 80 positioned between the outer flange 30 of the hub 29 and the segments 40,42 provide a compressible cushion support for the endless chain 36 entrained around the drive sprocket 18 that thereby effectively reduces noise transmitted by the track-type work machine 10. The driver members 80 not only aid in the suppression of noise but are a robust arrangement that is useful in environments where an elastomeric or rubber compound material would not provide long life, such as different mineral mining and the like. The outer and center segments 40,42 of the endless chain 36 provide a drive sprocket 18 constructed from simple components that are easily made and provide a reliable means for propelling the track-type machine 10.

Other aspects, objects, and advantages of this invention can be obtained from a study of the drawings, the disclosure and the appended claims.

What is claimed is:

1. A drive sprocket assembly, comprising:
   a hub having an outer circumferential surface;
   an endless chain positioned around the hub, the endless chain including a plurality of overlapping laminated segments each having an arcuate inner surface and at least one outwardly projecting tooth; and
   a plurality of hollow, compressible driver members positioned directly between the hub and said endless chain.

2. The drive sprocket assembly according to claim 1, wherein said plurality of driver members are tubular members having a predetermined diameter and wall thickness.

3. The drive sprocket assembly according to claim 2, wherein said plurality of driver members are metallic.

4. The drive sprocket assembly of claim 2, wherein said plurality of driver members are compressible and non-elastomeric.

5. The drive sprocket assembly according to claim 1, wherein said outer circumferential surface of said hub and said inner surface of said endless chain each include a plurality of driver slots.

6. The drive sprocket assembly according to claim 5, wherein said plurality of driver members are positioned in said plurality of driver slots.

7. The drive sprocket assembly of claim 1, wherein said endless chain includes a plurality of outer segments and a plurality of center segments connected together to form said endless chain, each one of said plurality of outer and center segments having an arcuate inner surface with a driver slot having a substantially constant radius, said driver slot extending radially from said inner surface and being positioned between said apertures, and said outer circumferential surface of said hub includes a plurality of spaced apart driver slots each having a substantially constant radius.

8. The drive sprocket assembly of claim 7, wherein said driver members are positioned within said respective driver slots in said hub and said associated driver slots in said outer and center segments of said endless chain.

* * * * *